Sept. 23, 1969      J. L. LORENZ      3,469,177

A.C. PHASE CONTROL SYSTEM RESPONSIVE TO A SENSED CONDITION

Filed Sept. 27, 1966

INVENTOR
JEROME L. LORENZ

BY Young, Ramy, Flynn & Tarolli

ATTORNEYS

United States Patent Office 3,469,177
Patented Sept. 23, 1969

3,469,177
A.C. PHASE CONTROL SYSTEM RESPONSIVE TO A SENSED CONDITION
Jerome L. Lorenz, Columbus, Ohio, assignor to Ranco Incorporated, Columbus, Ohio, a corporation of Ohio
Filed Sept. 27, 1966, Ser. No. 582,276
Int. Cl. G05f 1/60; H02p 13/14, 13/16
U.S. Cl. 323—19
16 Claims

ABSTRACT OF THE DISCLOSURE

An A.C. motor speed control circuit which is operable to govern the speed of a fan motor in response to sensed temperature. The circuit includes a differential amplifier operated by rectified unfiltered alternating current. The amplifier is associated with a semiconductor switch in circuit with the motor and is effective to control the amount of power supplied to the motor during half cycles of the power supply in accordance with the sensed temperature.

BACKGROUND OF THE INVENTION

Field of the invention

The present invention relates to electric power supply systems and more particularly relates to power supply systems operable to provide varying amounts of power to an electrical load according to variations in sensed conditions.

The prior art

In the past, power supply systems for A.C. loads have been constructed so that the load is energized during a portion of half cycles of the power supply. In other systems the load has been energized over a controlled number of half cycles. In either kind of system the energy supplied to the load is regulated, but in the first mentioned systems the power supplied to the load is substantially continuous during low power energization while the latter mentioned systems are basically of the on-off type.

When the load is in the form of an A.C. induction motor, the speed of the motor is controlled according to the power supplied in a given period and it is preferable to control operation of such motors by the first mentioned kind of system. Generally, a fast acting semiconductor switch such as an SCR is incorporated in series with the load to control the power supplied to it. Such semiconductor switches are operative to supply power to the load during portions of half cycles of the power supply depending on the phase angle between the power supply voltage and a control or gating signal to the semiconductor.

Triggering circuitry for such semiconductor switches has, in the past, comprised condition responsive circuits in which semiconductor elements have been abruptly rendered conductive in response to a sensed condition and have in turn supplied the control signal for the semiconductor switch in the load circuit. Such triggering circuits have not been satisfactory in many cases because the elements of these circuits do not operate consistently over appreciable ambient temperature ranges, i.e. the semiconductor elements of the triggering circuits have themselves been temperature dependent. Additionally such triggering circuits have been rendered conductive by circuit transients when undesired.

Differential amplifiers constructed from semiconductors have the well known advantage of temperature independence because of their bridge-like character but have, in the past, been usable primarily in D.C. circuits to produce a somewhat gradually changing output signal. The output signals from differential amplifiers thus have not been usable to control the phase angles at which semiconductor switches are rendered conductive.

SUMMARY OF THE INVENTION

The present invention provides an A.C. load control circuit in which a differential amplifier circuit is utilized to control the phase angle at which a load controlling switch is rendered conductive.

The amplifier is connected to the power supply to receive unifiltered rectified power. The amplifier circuit includes a capacitor arranged so that the voltage in the input and output circuits of the amplifier is slightly out of phase with biasing voltages applied to control electrodes of transistors in the branches of the amplifier. The biasing voltage level in one branch varies in response to changes in a sensed condition so that conduction in the branches of the amplifier is governed accordingly. This provides for operation as a differential amplifier even though connected to an unfiltered power supply and further permits a condition responsive triggering signal to be produced by the amplifier at substantially any time during a pulsation of the power supply.

A transistor in one branch of the differential amplifier is regeneratively connected to a third transistor. Thus when current flow in that branch reaches a predetermined level the branch abruptly becomes highly conductive to permit transmission of a triggering pulse to the load controlling switch. In this manner the load is energized at a particular time in a cycle of the power supply.

The phase shifting is accomplished by the capacitor as noted which is connected between the branches of the amplifier. The capacitor is charged through a resistor as the rectified power supply voltage rises. The charging capacitor has the effect of shifting the phase of the voltage applied across the branches of the amplifier to lag the phase angle of the power supply. The biasing voltage level applied to the base electrodes of the transistors in each branch are connected to the rectified power supply voltage and are in phase with the power supply. Thus the triggering branch of the amplifier can be rendered conductive even after the peak voltage of the power supply has been reached.

When the triggering branch of the amplifier is rendered highly conductive the capacitor discharges through that branch to provide a current pulse for rendering the semiconductor conductive.

The principal object of the present invention is the provision of a new and improved electric power supply system for an alternating current electrical load circuit and comprising circuit elements effective to control the amount of power transmitted to the load in response to a sensed condition, and which is highly sensitive, easily manufactured, and comprises a small number of relatively inexpensive parts.

Another object of the invention is the provision of a new and improved power supply system for an A.C. load in which a differential amplifier is utilized to control the power supply phase angle at which the load is energized and wherein the amplifier is operable to effect energization of the load late in a half cycle of the power supply.

Another object of the present invention is the provision of a new and improved power supply system for an electric load utilizing alternating current and including a controlled rectifier arranged to pass the alternating current and which is rendered conductive in each half cycle by a condition responsive control circuit which includes a charging circuit adapted to deliver a pulse for triggering the controlled rectifier to a conductive state for predetermined periods of each half cycle and wherein the triggering pulse is provided to the rectifier substantially instantaneously at a time in the cycle controlled by the sensed condition.

Yet another object of the present invention is the provision of a new and improved power supply system for an alternating current electric motor or the like and comprising a controlled rectifier included in the motor circuit and a triggering circuit operable to render the controlled rectifier conductive at a desired time in a half cycle of the alternating source current comprising, first and second transistors regeneratively coupled together with an output thereof connected to a gate or control electrode of the controlled rectifier and a charging circuit cooperating with the transistors so that the charging circuit discharges through the transistors to render the controlled rectifier conductive at a desired time during a half cycle of the source.

Another object of the present invention is the provision of a new and improved circuit control system as set forth in the next preceding paragraph and wherein the time in the half cycle at which the controlled rectifier is rendered conductive is controlled by circuit elements including a third transistor rendered conductive at a time in the cycle which is controlled according to sensed temperature.

A still further object of the present invention is the provision of a new and improved power supply system for an electric motor, or the like, connected to an alternating current source by a controlled rectifier and wherein the controlled rectifier is rendered conductive in response to energization of a triggering circuit means including first and second transistors regeneratively connected and transformer means coupling the transistors to the controlled rectifier and having a primary winding connected to the transistors and a secondary winding connected to a gate or control electrode of the controlled rectifier whereby energization of the triggering circuit means is effective to provide a pulse in the secondary winding which renders the controlled rectifier conductive to energize the motor.

Other objects and advantages of the present invention will become apparent from the following detailed description thereof made with reference to the accompanying drawings which form a part of the specification.

DESCRIPTION OF THE PREFERRED EMBODIMENTS

Figure 1:
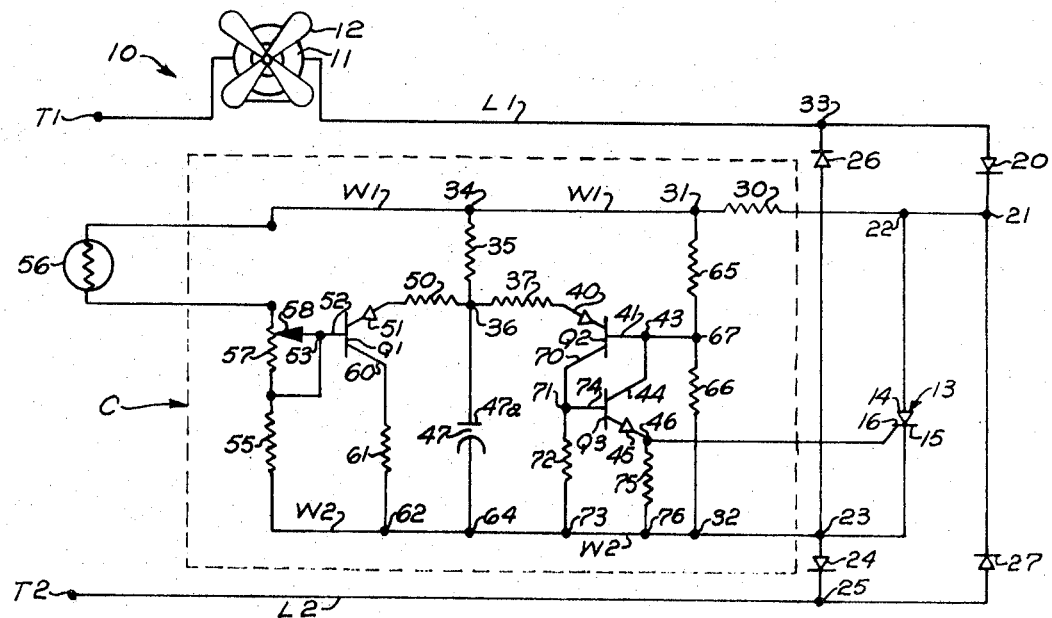
FIG. 1 is a schematic illustration of an electric power supply system embodying the present invention.

The present invention provides an improved electric power supply system in which alternating current power for an electrical load is controlled in accordance with a sensed condition, such as temperature. A system 10 embodying the present invention is illustrated in the drawings for controlling the speed of an alternating current motor 11 in a conventional type refrigeration apparatus, not shown, to drive an air circulating fan 12 at speeds controlled in response to temperature of the air in a certain portion of the apparatus. The fan 12 is adapted to circulate cooled air in a portion of the refrigeration apparatus with the speed of the fan controlled to maintain a given temperature therein. It will become apparent from the following that circuitry embodying the present invention is useful in many other applications wherein a load is controlled in response to a sensed physical condition such as light, heat or pressure.

Figure 3:
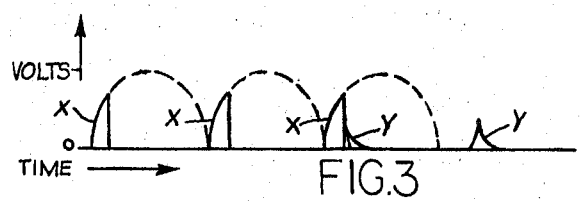
FIG. 3 is a graphic illustration of voltage wave forms at locations in the circuitry of FIG. 1 with the wave forms shown on different scales for purposes of illustration.

Electric power in the form of 120 volt alternating current, for example, is supplied from a suitable source, not shown, including terminals T1, T2. One terminal of the motor 11 is connected to the terminal T1 and the other terminal of the motor is connected with the terminal T2 through a circuit including a line L1, a controlled rectifier 13, and a line L2 connected to the terminal T2. The controlled rectifier 13 is preferably a type which is sometimes referred to as a silicon-controlled rectifier, or SCR. The SCR 13 is normally non-conductive and becomes conductive in one direction in response to a voltage at its anode 14 which is positive with respect to its cathode 15 but only after impressing of a voltage upon its control, or gate, electrode 16 which is positive with respect to the cathode thereof. The SCR 13 is arranged in circuitry to pass both cycles of the alternating current for the motor 11, and when the SCR is conductive, or gated, as described, during the positive half cycles of the source, the energization circuit of the motor 11 can be traced through the terminal T1, the windings of the motor 11, the line L1, a diode 20, junction 21, junction 22, the SCR 13, junction 23, diode 24, junction 25, the line L2 to the terminal T2. During the negative half cycles of the source, the energization circuit for the motor may be traced from the terminal T2, to the line L2, the junction 25, a diode 27, junction 21, junction 22, SCR 13, junction 23, a diode 26, a junction 33, the line L1, through the windings of the motor 11 and to the terminal T1. A representative wave form of the voltage across the SCR 13 is illustrated by the curves X in FIG. 3.

The gate 16 of the controlled rectifier or SCR 13 receives such a positive signal as to render the SCR 13 conductive in response to operation of control circuitry connected therewith and generally designated C. The control circuit C is connected between the power lines L1, L2 through a full-wave rectifier including the diodes 20, 26, 27, and 24 and which is operable to supply the control circuit C with full-wave rectified pulsating direct current across the junctions 22, 23, as will be described hereinafter. During a positive half cycle of the power supply, that is to say, when the terminal T1 is positive with respect to the terminal T2, the circuit current flow is from the terminal T1 through the line L1, motor 11, diode 20, junctions 21, 22, to the control circuit C, including a resistor 30, a junction 31, a conductor W1, certain elements of the control circuit C, described more fully hereinafter, a conductor W2, to junctions 32, 23, diode 24, junction 25, the line L2 and to the terminal T2. During a negative half cycle of the power supply, when the terminal T2 is positive with respect to the terminal T1, an energization circuit for the circuit C is completed from the terminal T2 through the line L2, diode 27, junctions 21, 22, resistor 30, the junction 31, the conductor W1, elements of the control circuit C, the conductor W2, the junctions 32, 23, the diode 26, junction 33, the conductor L1, the motor 11 and to the terminal T1.

The resistor 30 is a voltage reducing resistor which is effective to maintain the voltage across the control circuit C low enough to prevent damage to the components thereof. When the controlled rectifier 13 is non-conductive, the resistor 30 and the components of the control circuit C represent an extremely high impedance as compared to the impedance of the motor 11 such that most of the voltage drop between terminals T1 and T2 takes place across these components, providing minimal energization of the motor 11. However, when the SCR 13 is rendered conductive, current is shunted around the high impedance control circuit C so that substantially the entire voltage drop between terminals T1 and T2 takes place across the motor 11. The control circuit C controls the period that the SCR 13 is capable of conducting during each half cycle of the power supply and thereby controls the amount of torque produced by the motor, and therefore the speed of the fan.

The control circuit C includes a differential amplifier circuit having first and second branches including PNP transistors Q1, Q2, respectively, and a triggering circuit which includes an NPN transistor Q3, which is operable to render the SCR 13 conductive at a time during each half cycle of the power supply according to a sensed condition. The triggering circuit provides a triggering pulse to the gate 16 of the SCR 13 in response to turning on of the transistor Q3. The transistor Q3 is regeneratively coupled to the transistor Q2 and is turned on in response to turning on of the transistor Q2, as will be described, to render the SCR 13 conductive.

The transistors Q1, Q2 include emitter-base circuits which are each connected to the conductor W1 by a junction 34 through a junction 36 and a resistor 35. The junction 36 forms part of a charging circuit means including the resistor 35 and a capacitor 47 which are serially connected between the junction 34 at the conductor W1 and a junction 64 at the conductor W2. During each rectified direct current pulsation of the power supply, the capacitor 47 and the resistor 35 cooperate to provide an accumulation of charge on the plate 47a of the capacitor as the potential at the junction 34 increases. The capacitor 47, during charging, provides a slight shift in the phase of the voltage across its plates with respect to the power supply voltage. In the preferred construction the voltage across the capacitor lags the power supply by about 10°.

As the capacitor 47 charges, the potential at the junction 36 increases, and when the potential at the junction 36 has risen to a particular value, the emitter-base circuit of the transistor Q1 is rendered conductive and current is conducted from the junction 36 through a resistor 50, the emitter 51, and base 52 of the transistor Q1, junction 53, a resistor 55, the conductor W2, the junction 23 and through either the diode 24 to the terminal T2 or through the diode 26, the motor 11 to terminal T1, depending upon the direction of the alternating current. Conduction in the emitter-base circuit of the transistor Q1 is affected by a voltage divider formed by a temperature responsive resistor or sensor resistor 56, a potentiometer 57, the resistance of which is controlled by a wiper 58 thereof, the junction 53 and the resistor 55, all of which are serially connected between the conductors W1, W2. It should be apparent that the voltage divider just described provides a biasing voltage at the junction 53 which determines the conductivity of the emitter-base circuit of the transistor Q1 and therefore the conductivity of that transistor.

When the voltage at the junction 36 increases to a value which is larger than that provided at junction 53 by the voltage divider circuit, current flows through the emitter-base circuit of the transistor Q1 as described, rendering the emitter-collector circuit conductive. The emitter-collector circuit for the transistor Q1 may be traced from the conductor W1 through the resistor 35, the junction 36, the resistor 50, the emitter 51 and collector 60 of the transistor Q1, and a resistor 61 to the conductor W2 by way of junction 62.

The conductivity of the transistor Q1 controls the amplitude of the voltage across the capacitor 47. That is, when the transistor Q1 is only slightly conductive, the voltage across the capacitor rises quickly while if the transistor Q1 is highly conductive the voltage rise across the capacitor is relatively slow. The base electrodes 52, 41 of the transistors Q1 and Q2, respectively, are both subjected to voltages which are positive with respect to their respective emitters at the beginning of each rectified power supply pulsation with the base of the transistor Q2 normally having the greater of these voltages so that the transistor Q1 becomes conductive earlier in each rectified power supply pulsation than does the transistor Q2. With the transistor Q1 conducting, current is shunted therethrough and around the transistor Q2 to delay turning on thereof until the voltage across the capacitor 47 rises sufficiently to initiate conduction in the transistor Q2. The voltage at the base of the transistor Q2 is provided by a voltage divider formed by resistors 65, 66 which are serially connected between the junctions 31, 32 and having an intermediate junction 67 connected to the base 41 of the transistor Q2.

During each rectified power supply pulsation (i.e., for each half cycle of the alternating current power supply), even after transistor Q1 is turned on, the potential at junction 36 will increase because of the continuing increase of the instantaneous amplitude of the rectified power supply pulsation and continued charging of the capacitor 47. When the voltage at the junction 36 has reached a value which is larger than the biasing voltage at the junction 67, an emitter-base current is established in the transistor Q2 which is effective to establish an emitter-collector circuit therein. The emitter-base circuit for the transistor Q2 is completed from the junction 36 through a resistor 37, the emitter 40, and base 41 of the transistor Q2, junctions 43, 67, the resistor 66, junctions 32, 23, and to either the terminal T2 through diode 24 or to terminal T1 through diode 26, depending upon the direction of the alternating current. The emitter-collector circuit for the transistor Q2 may be traced from the junction 36 through the resistor 37, the emitter 40 and collector 70 of the transistor Q2, a junction 71, a resistor 72, a junction 73, and to the conductor W2.

The current flowing through the emitter-collector circuit of the transistor Q2 continues to increase as the voltage at the junction 36 rises in accordance with the voltage across the capacitor 47 lagging the rectified power supply pulsation continues to increase in amplitude, and when a predetermined current flow is established therein the voltage at junction 71 is sufficiently large to render the base-emitter circuit of the transistor Q3 conductive. The base-emitter circuit for the transistor Q3 can be traced from the junction 71, through the base 74 and emitter 45 of the transistor Q3, a junction 46, and a resistor 75 connected between the junction 46 and a junction 76 at the conductor W2. When the base-emitter circuit of the transistor Q3 is established, a collector-emitter circuit for the transistor is completed from the junction 43, at the base 41 of the transistor Q2, through the collector 44 and emitter 45 of the transistor Q3 to the junction 46, which is connected to the gate 16 of the SCR 13 and to the conductor W2 through the resistor 75. The resistor 75 establishes a potential difference between the gate 16 and cathode 15 of the SCR 13.

When the aforementioned circuits in the transistors Q2, Q3 are established, the transistors Q2, Q3 are turned full on in a regenerative manner. More specifically, conduction in the collector-emitter circuit of the transistor Q3 provides an increased flow of emitter-base current at the transistor Q2 which turns the transistor Q2 full on. When the transistor Q2 turns full on, current flow in its emitter-collector circuit increases and increases the base-emitter current in the transistor Q3, thereby turning the transistor Q3 full on. When the transistors Q2, Q3 are turned full on, they conduct with low resistance so that the capacitor 47 discharges primarily through the emitter-collector circuit of the transistor Q2, the base-emitter circuit of the transistor Q3 and into the gate 16 of the SCR 13. Discharging of the capacitor 47 through the transistors Q2, Q3 as described, provides a substantially instantaneous triggering pulse at the gate 16 to effect forward conduction of the SCR 13 to complete the circuit between the terminals T1, T2 through the fan motor 11. A representative wave form of the aforementioned triggering pulse is illustrated by the curves Y of FIG. 3.

It should be apparent from the foregoing description, that the control circuit C is effective to provide a triggering pulse to the gate of the SCR 13 at a particular time during each rectified pulsation of the power supply which is determined by the resistance of the sensor 56. The sensor 56, as noted, is a temperature sensitive resistor and may be placed at any suitable location in the refrigerator. With the sensor 56 positioned in heat exchange relation with a part of the refrigerator, temperature changes of the part are effective to change the resistance of the sensor 56 and thus change the voltage level at the base of the transistor Q1. Thus, the point in each half cycle at which the SCR is rendered conductive varies according to the temperature condition at the sensor 56. As shown in FIG. 1, the wiper 58 of the potentiometer 57 is connected to the base of the transistor Q1 at the junction 53 so that movement of the wiper 58 changes the voltage at the base 52 of the transistor independently of the temperature sensed by the sensor 56 to change the forward voltage required to turn on the transistor. The wiper 58 is preferably constructed so as to be accessible to the user of the refrigeration apparatus and is manually adjustable to permit operation of the control circuit C through variable sensed temperature ranges.

The temperature sensor 56 of the preferred embodiment of the invention has a negative temperature coefficient of resistance so that as sensed temperatures increase, the voltage at the base of the transistor Q1 is relatively high as compared to the voltage at the base of the transistor Q2 so that transistor Q2 is rendered conductive relatively early in each power supply pulsation, resulting in increased fan speed. When the sensed temperature decreases, the voltage at the base of the transistor Q1 is relatively low as compared to the voltage at the base of transistor Q2, resulting in retardation of conduction of transistor Q2 and reduced fan speed.

While in the illustrated embodiment the sensor 56 is connected between the conductor W1 and the junction 53, it should be appreciated that if the sensor 56 and the resistor 55 are interchanged, the sense direction of the differential amplifier is changed; that is to say, increased resistance of the sensor 56 will result in conduction of the transistor Q2 relatively early in the cycle to increase the fan speed, while decreased resistance of the sensor 56 will effect conduction of the transistor Q2 relatively late in the cycle.

Figure 2:
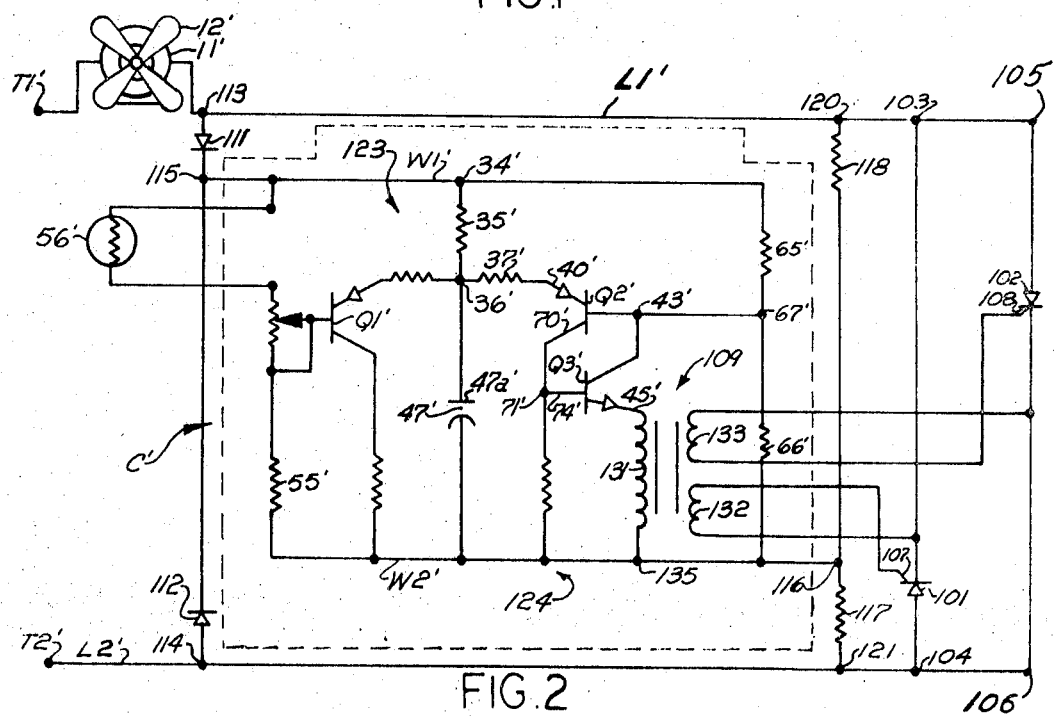
FIG. 2 is a schematic illustration of a modified power supply system embodying the present invention.

A modified power supply system embodying the present invention is shown in FIG. 2, wherein parts which are similar to parts which have been previously described are designated by corresponding primed reference characters. As shown in FIG. 2, an electrical load 11', which may be a motor for a fan, is connected between the terminals T1', T2' by conductors L1', L2' and first and second SCR's 101, 102 which are connected in parallel between conductors L1', L2'. The SCR 101 is connected between the conductors L1', L2' at junctions 103, 104 and is oriented so as to permit negative half cycles of the source to energize the load 11' under conditions which will be described hereinafter. The SCR 102 is connected between the conductors, L1', L2' by junctions 105 and 106 and is oriented to permit positive half cycles of the source to energize the load 11' when the SCR 102 is conductive. The SCR's 101, 102 are rendered conductive in response to a voltage impressed upon their gate electrodes 107, 108, respectively as described above in reference to FIG. 1. The gates 107, 108 are coupled by a transformer means 109 to an output of a control circuit C' which is effective to provide a triggering pulse to the gates 107, 108 to render the SCR's 101, 102 conductive.

The control circuit C' is connected between the conductors L1', L2' through a full-wave rectifier and voltage reducing resistors. The rectifier circuit includes diodes 111, 112 which are connected between the conductors L1', L2', at junctions 113, 114. The diode 111 is oriented so as to conduct during a positive half cycle of the source and directs current through a junction 115, a conductor W1', elements of the control circuit C', a conductor W2', a junction 116, a voltage reducing resistor 117 and to the terminal T2. The diode 112 is oriented so as to direct negative half cycles of the source from the terminal T2' through the junction 115, the conductor W1', elements of the control circuit C', the conductor W2', the junction 116, a voltage reducing resistor 118 and to the terminal T1'. It should be apparent that during a positive half cycle of the source, the diode 112 does not conduct and similarly that during a negative half cycle of the source, the diode 111 does not conduct so that the current supplied to the control circuit C' is full-wave rectified, pulsating direct current. The aforementioned voltage reducing resistors 117, 118 are serially connected between the conductors L1', L2' at junctions 120, 121, respectively. The resistance of each of the resistors 117, 118 is high so that the voltage across the control circuit C' is maintained at a suitable low level. As noted previously in reference to FIG. 1, when the SCR's are nonconducting, the impedance of the resistors 117, 118 and the control circuit C' are high so that the voltage drop across the motor 11' is minimal.

The control circuit C' includes elements forming a differential amplifier, generally indicated at 123, and a cooperating triggering circuit 124. The circuit arrangement and elements of the differential amplifier 123 are substantially the same as described above in reference to FIG. 1 except that the triggering circuit 124 is coupled to the gates of the SCR's 101, 102 through the transformer 109 as mentioned above. The transformer 109 includes a primary winding 131 and a pair of secondary windings 132, 133. When the triggering circuit formed by the transistors Q2', Q3' is conductive, the capacitor 47' discharges primarily through the base-emitter circuit of the transistor Q3' and the primary winding 131 of the transformer 109. An energization circuit for the primary winding 131 of the transformer 109 may be traced from the junction 115 at the output of the rectifier circuit, through the junction 34', the resistor 35', junction 36', resistor 37', the emitter 40' and collector 70', of the transistor Q2', the junction 71', base 74' and the emitter 45' of the transistor Q3', the primary winding 131, a junction 135, the junction 116, through either the resistor 117 or the resistor 118 and to the negative terminal of the alternating current circuit by way of an appropriate one of the conductors, L1', L2'. The pulse in the primary winding 131 of the transformer 109 induces pulses in the secondary windings 132, 133 which are directed to the gates 107 and 108 of the SCR's 101, 102, respectively.

It should be apparent from the foregoing, that the triggering circuit including the transistors Q2', Q3', provides a triggering pulse to the gates 107, 108 of the SCR's during each half cycle of the power supply to provide full-wave phase control for the motor 11'. During a positive alternation of the current, the anode of the SCR 101 is negative with respect to its cathode so that the triggering pulse to its gate 107 is ineffective to render the SCR 101 conductive. However, the SCR 102 conducts during a positive alternation of the current since its anode is positive with respect to its cathode and its gate 108 is triggered from the secondary winding 133. Conversely, during a negative alternation of the current, the anode of the SCR 102 is negative with respect to its cathode and does not conduct while the SCR 101 has a forward voltage thereacross so that a pulse to its gate 107 from the secondary winding 132 renders the SCR 101 conductive.

As noted previously in reference to FIG. 1, the condition responsive resistor 56' controls the voltage at the base of the transistor Q1' which in turn controls the time in a cycle of the power supply at which the transistors Q2', Q3' are turned on. As noted above, the sensing resistor 56' may be interchanged with the resistor 55' so as to change the sense direction of the differential amplifier.

Represented values of the various circuit elements of a preferred embodiment of the present invention as illustrated in FIG. 1 are as follows.

| Resistors: | Ohms |
|---|---|
| 30 | 15K |
| 35 | 5.6K |
| 37 | 56 |
| 50 | 56 |
| 56 (@ 25° C.) | 10K |
| 57 (pot.) | 5K |
| 55 | 10K |

Resistors: Ohms
- 61 — 1K
- 65 — 10K
- 66 — 10K
- 72 — 1K
- 75 — 1K

Diodes:
- 20 — MR1032B
- 24 — MR1032B
- 26 — MR1032B
- 27 — MR1032B

Silicon-controlled rectifier:
- 13 — MCR2604

Capacitor:
- 47 — mf .5

Transistors:
- Q1 — 2N3638
- Q2 — 2N3638
- Q3 — 2N3394

Represented values of elements of the circuit apparatus in reference to FIG. 2 are as follows:

Resistors: Ohms
- 35' — 5.6K
- 37' — 56
- 50' — 56
- 56' (@ 25° C.) — 10K
- 57' (pot.) — 5K
- 55' — 10K
- 61' — 1K
- 65' — 10K
- 66' — 10K
- 72' — 1K
- 117 — 8.2K
- 118 — 8.2K Diodes:
- 111 — 1N456A
- 112 — 1N456A Silicon-controlled rectifiers:
- 101 — MCR2604
- 102 — MCR2604

Capacitor:
- 47' — mf .1

Transistors:
- Q1' — 2N3638
- Q2' — 2N3638
- Q3' — 2N3394

It can now be seen that there has been provided an improved power supply system in which the power supply system in which the power supplied to an alternating current electrical load, such as a motor, is controlled in response to a sensed condition and in which a controlled rectifier is rendered conductive by the operation of a triggering circuit as controlled by the sensed condition.

Having described by invention, I claim:

1. A power supply system for an electrical load to be operated from an alternating current power supply, a semiconductor switch connected in series with the load, said switch including a control electrode and circuit means for producing and conducting a pulse to said control electrode in response to a sensed condition, said circuit means including a differential amplifier and a triggering circuit including switch means rendered conductive by said differential amplifier and operable to conduct a pulse for rendering said semiconductor switch conductive, said differential amplifier including circuit elements operable to conduct current at a rate determined by a sensed condition and to control the phase angle during a half cycle of said power supply at which said semiconductor switch is rendered conductive said circuit elements of said differential amplifier including first and second transistors having output circuits connected in parallel and a temperature responsive circuit for biasing said transistors against conduction, said first transistor rendered conductive at a time in said half cycle dependent on sensed temperature and operable to shunt current around said second transistor, and retarding conduction of said second transistor, said triggering circuit including capacitance means connected to said second transistor and operable to discharge through said second transistor to provide a triggering pulse to said semiconductor switch when said second transistor is rendered conductive.

2. A power supply system for an electrical load to be operated from an alternating current power supply, a semiconductor switch connected in series with the load, said switch including a control electrode and circuit means for producing and conducting a pulse to said control electrode in response to a sensed condition, said circuit means including a differential amplifier and a triggering circuit including switch means rendered conductive by said differential amplifier and operable to conduct a pulse for rendering said semiconductor switch conductive, said differential amplifier including circuit elements operable to conduct current at a rate determined by a sensed condition and to control the phase angle during a half cycle of said power supply at which said semiconductor switch is rendered conductive said circuit elements of said differential amplifier including first and second transistors having output circuits connected in parallel and a temperature responsive circuit for biasing said transistors against conduction, said first transistor rendered conductive at a time in said half cycle dependent on sensed temperature and operable to shunt current around said second transistor, and retarding conduction of said second transistor, said triggering circuit including a third transistor regeneratively coupled to said second transistor with said second and third transistors cooperating to form said triggering circuit, said third transistor coupled to said electrode of said semiconductor switch.

3. A power supply system for an electrical load to be operated from an alternating current power supply, a semiconductor switch connected in series with the load, said switch including a control electrode and circuit means for producing and conducting a pulse to said control electrode in response to a sensed condition, said circuit means including a differential amplifier and a triggering circuit including switch means rendered conductive by said differential amplifier and operable to conduct a pulse for rendering said semiconductor switch conductive, said differential amplifier including circuit elements operable to conduct at a rate determined by a sensed condition and to control the phase angle during a half cycle of said power supply at which said semiconductor switch is rendered conductive said circuit elements of said differential amplifier including first and second transistors having output circuits connected in parallel and a temperature responsive circuit for biasing said transistors against conduction, said first transistor rendered conductive at a time in said half cycle dependent on sensed temperature and operable to shunt current around said second transistor, and retarding conduction of said second transistor, said triggering circuit including one of said first and second transistors and a third transistor regeneratively coupled to turn on in response to a predetermined current in said one of said first and second transistors to complete said triggering circuit to said semiconductor switch.

4. A power supply system for an electrical load to be operated from an alternating current power supply, a semiconductor switch connected in series with the load, said switch including a control electrode and circuit means for producing and conducting a pulse to said control electrode in response to a sensed condition, said circuit means including a differential amplifier and a triggering circuit including switch means rendered conductive by said differential amplifier and operable to conduct a pulse for rendering said semiconductor switch conductive, said differential amplifier including circuit elements operable to conduct current at a rate determined by a sensed condition and to control the phase angle during a half cycle of said power supply at which said semiconductor switch is rendered conductive, said circuit elements comprising capacitance means connected in said triggering circuit and operable to discharge through one branch of said amplifier to provide a triggering pulse to said semiconductor switch upon operation of said switch means.

5. A power supply system for a load adapted to be connected to an alternating current power supply, controlled rectifier means connected in circuit with said load and operable between a first condition wherein current flow therethrough is blocked and said load is substantially de-energized and a second conductive condition providing a low resistance to current flow therethrough and wherein said load is energized, said controlled rectifier means including gate means for operating said rectifier means between said conditions in response to a triggering pulse, and means for providing a triggering pulse to said gate means to render said rectifier means conductive, said means including a triggering circuit having first and second transistors connected together and operable between a conductive and non-conductive condition with an output thereof coupled to said gate means, and charging means connected to an input of said triggering circuit including an element which is charged when said triggering circuit is in a non-conductive condition and with said element effective to discharge through said first and second transistors when said transistors are in a conductive condition to provide said triggering pulse to said gate means.

6. A system as defined in claim 5 wherein said output of said triggering circuit includes transformer means having a primary winding connected to the output of said transistors and a secondary winding connected to said gate means and wherein said charging means discharges through said primary winding of said transformer means to provide a pulse of current in said secondary winding of said transformer means to trigger said gate means.

7. A system as defined in claim 5 wherein said rectifier means includes first and second oppositely poled controlled rectifiers, each of said rectifiers being coupled to said load and connected in parallel with the other, and wherein the output of said triggering circuit is coupled to gate electrodes of said rectifiers, respectively, by transformer means including a primary winding connected to said output of said triggering circuit and first and second secondary windings connected to said gate electrodes of said first and second controlled rectifiers, respectively, said charging means discharging to provide a triggering pulse to the gate of each of said controlled rectifiers during a cycle of the power supply to render one of said controlled rectifiers conductive.

8. A power supply system for an electric load to be energized for an alternating current power supply comprising a controlled rectifier connected in series with the load and operable to conduct current in response to a triggering pulse provided to a gate electrode thereof, a triggering circuit connected in parallel with said controlled rectifier and operatively associated with said gate electrode to provide said triggering pulse, said triggering circuit including switching amplifier means comprising first and second transistors regeneratively interconnected and with said transistors rendered conductive at a predetermined time during a half cycle of said power supply, and a charging circuit connected to said transistors said charging circuit including a circuit element which is charged prior to said transistors becoming conductive and which discharges through said transistors when said transistors are rendered conductive to provide a triggering pulse to said controlled rectifier.

9. A system as defined in claim 8 and further including transformer means coupling said triggering circuit and said controlled rectifier and wherein a first winding of said transformer means is connected in said triggering circuit and a second winding of said transformer means is connected to said gate electrode of said controlled rectifier, and with said first and second windings cooperating to provide said pulse to said controlled rectifier.

10. A power supply system as defined in claim 9 and further including a second controlled rectifier connected in parallel with said first controlled rectifier and oriented for conduction in a direction opposite to the direction of conduction of said first controlled rectifier, and a third transformer winding connected to a gate electrode of said second controlled rectifier and cooperating with said first winding to provide a pulse to said second controlled rectifier.

11. A power supply system for an electrical load to be operated from an alternating current power supply, a semiconductor switch connected in series with the load, said switch including a control electrode and circuit means for producing and conducting a pulse to said control electrode in response to a sensed condition, said circuit means including a differential amplifier and a triggering circuit including switch means rendered conductive by said differential amplifier and operable to conduct a pulse for rendering said semiconductor switch conductive, said differential amplifier including circuit elements operable to conduct current at a rate determined by a sensed condition and to control the phase angle during a half cycle of said power supply at which said semiconductor switch is rendered conductive, said circuit elements including circuitry operable to provide a shift in the phase of voltages applied to input circuits of said amplifier relative to the phase of biasing voltages in said input circuits.

12. A power supply system as defined in claim 11 wherein said phase shifting circuitry comprises a charging circuit connected to said input circuits and operative to cause the voltage applied across said input circuits to lag said biasing voltages.

13. A power supply system for controlling energization of an A.C. load through a gated semiconductor switch comprising:
(a) an A.C. power supply;
(b) a control circuit coupled to the gate electrode of said semiconductor for triggering said semiconductor at a time in a cycle of said power supply dependent upon a sensed condition;
(c) a rectifier for providing unfiltered pulsating current to said control circuit;
(d) said control circuit comprising a differential amplifier having first and second branches including first and second transistors respectively;
(e) circuitry providing pulsating biasing voltages at control electrodes of said transistors;
(f) one of said biasing voltages having an instantaneous amplitude determined by a sensed condition; and,
(g) circuit elements for producing a phase shift between the voltage applied to input circuits of said amplifier and said biasing voltages so that said transistors can be rendered conductive late in a half cycle of the power supply.

14. A power supply system as defined in claim 13 wherein said circuit elements comprise a charging circuit including a capacitor connected in parallel with said input circuits of said transistors so that the voltage across said input circuits lags said biasing voltages.

15. A power supply system as defined in claim 14 further including a triggering circuit including one of said transistors coupled to said semiconductor switch, said triggering circuit effective to transmit a triggering pulse in response to a predetermined amount of conduction in said one transistor, and wherein said capacitor discharges through said triggering circuit to provide a gating signal for said semiconductor.

16. A power supply system as defined in claim 15 wherein said triggering circuit includes a third transistor coupled to said one of said first and second transistors to be abruptly rendered conductive when said predetermined current flows.

References Cited

UNITED STATES PATENTS

| | | | |
|---|---|---|---|
| 3,136,877 | 6/1964 | Heller | 307—252 X |
| 3,175,077 | 3/1965 | Fox et al. | 219—494 |
| 3,283,179 | 11/1966 | Carlisle et al. | |
| 3,316,423 | 4/1967 | Hull. | |
| 3,329,887 | 7/1967 | Schaeve. | |

JOHN F. COUCH, Primary Examiner

A. D. PELLINEN, Assistant Examiner

U.S. Cl. X.R.

219—494, 501; 323—22, 24, 37; 330—30